(12) United States Patent
Llull Vera

(10) Patent No.: US 11,576,762 B2
(45) Date of Patent: Feb. 14, 2023

(54) TOOTH FLOSSING ASSEMBLY

(71) Applicant: Francisco J. Llull Vera, Ponce, PR (US)

(72) Inventor: Francisco J. Llull Vera, Ponce, PR (US)

(*) Notice: Subject to any disclaimer, the term of this patent is extended or adjusted under 35 U.S.C. 154(b) by 533 days.

(21) Appl. No.: 16/732,452

(22) Filed: Jan. 2, 2020

(65) Prior Publication Data

US 2021/0205059 A1 Jul. 8, 2021

(51) Int. Cl.
*A61C 15/04* (2006.01)

(52) U.S. Cl.
CPC .................. *A61C 15/046* (2013.01)

(58) Field of Classification Search
CPC ....... A61C 7/08; A61C 15/046; A61C 15/048; A61C 15/00; A46B 2200/108; A46B 15/0069; A63B 71/085
See application file for complete search history.

(56) References Cited

U.S. PATENT DOCUMENTS

| | | | | |
|---|---|---|---|---|
| 2,180,522 A | * | 11/1939 | Henne | A61C 15/046 D28/66 |
| 3,335,718 A | * | 8/1967 | Sexton | A61H 13/00 601/139 |
| 4,332,559 A | * | 6/1982 | Dolinsky | A61C 15/046 433/91 |
| 5,022,417 A | * | 6/1991 | Cimini | A61C 15/046 132/323 |
| 5,190,062 A | * | 3/1993 | Rafaeli | A61C 15/046 132/323 |
| D599,557 S | | 9/2009 | Crossman | |
| 8,091,567 B2 | | 1/2012 | Toor | |
| D670,866 S | | 11/2012 | Chappuis | |
| 8,936,031 B2 | * | 1/2015 | Sahoo | A61C 15/046 132/323 |
| 10,582,989 B2 | * | 3/2020 | Wallace | A61C 9/0006 |
| 11,013,584 B2 | * | 5/2021 | Horton | A61C 15/048 |
| 2003/0140937 A1 | * | 7/2003 | Cook | A61C 15/046 132/323 |
| 2005/0133057 A1 | | 6/2005 | Kirstein | |
| 2006/0014121 A1 | * | 1/2006 | DelGrosso | A61C 15/046 433/216 |

* cited by examiner

*Primary Examiner* — Cris L. Rodriguez
*Assistant Examiner* — Brianne E Kalach

(57) ABSTRACT

A tooth flossing assembly for simultaneously flossing an entire row of teeth includes a mouthpiece that is curved along a longitudinal axis to conform to the curvature of a row of a user's teeth. The mouthpiece has a plurality of engagement points positioned thereon. The engagement points are spaced apart from each other and are distributed along the mouthpiece at locations corresponding to the locations between each tooth in the row of the user's teeth. A plurality of flossing units is provided and each of the flossing units is removably coupled between a respective pair of the engagement points. Each of the flossing units includes a string that slides between a respective pair of the user's teeth when the user pushed up or bites down on the mouthpiece. In this way the plurality of flossing units can simultaneously floss the entire row of teeth.

4 Claims, 4 Drawing Sheets

TOOTH FLOSSING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to flossing devices and more particularly pertains to a new flossing device for simultaneously flossing an entire row of teeth.

BRIEF SUMMARY OF THE INVENTION

An embodiment of the disclosure meets the needs presented above by generally comprising a mouthpiece that is curved along a longitudinal axis to conform to the curvature of a row of a user's teeth. The mouthpiece has a plurality of engagement points positioned thereon. The engagement points are spaced apart from each other and are distributed along the mouthpiece at locations corresponding to the locations of each tooth in the row of the user's teeth. A plurality of flossing units is provided and each of the flossing units is removably coupled between a respective pair of the engagement points. Each of the flossing units includes a string that slides between a respective pair of the user's teeth when the user bites down on the mouthpiece. In this way the plurality of flossing units can simultaneously floss the entire row of teeth.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
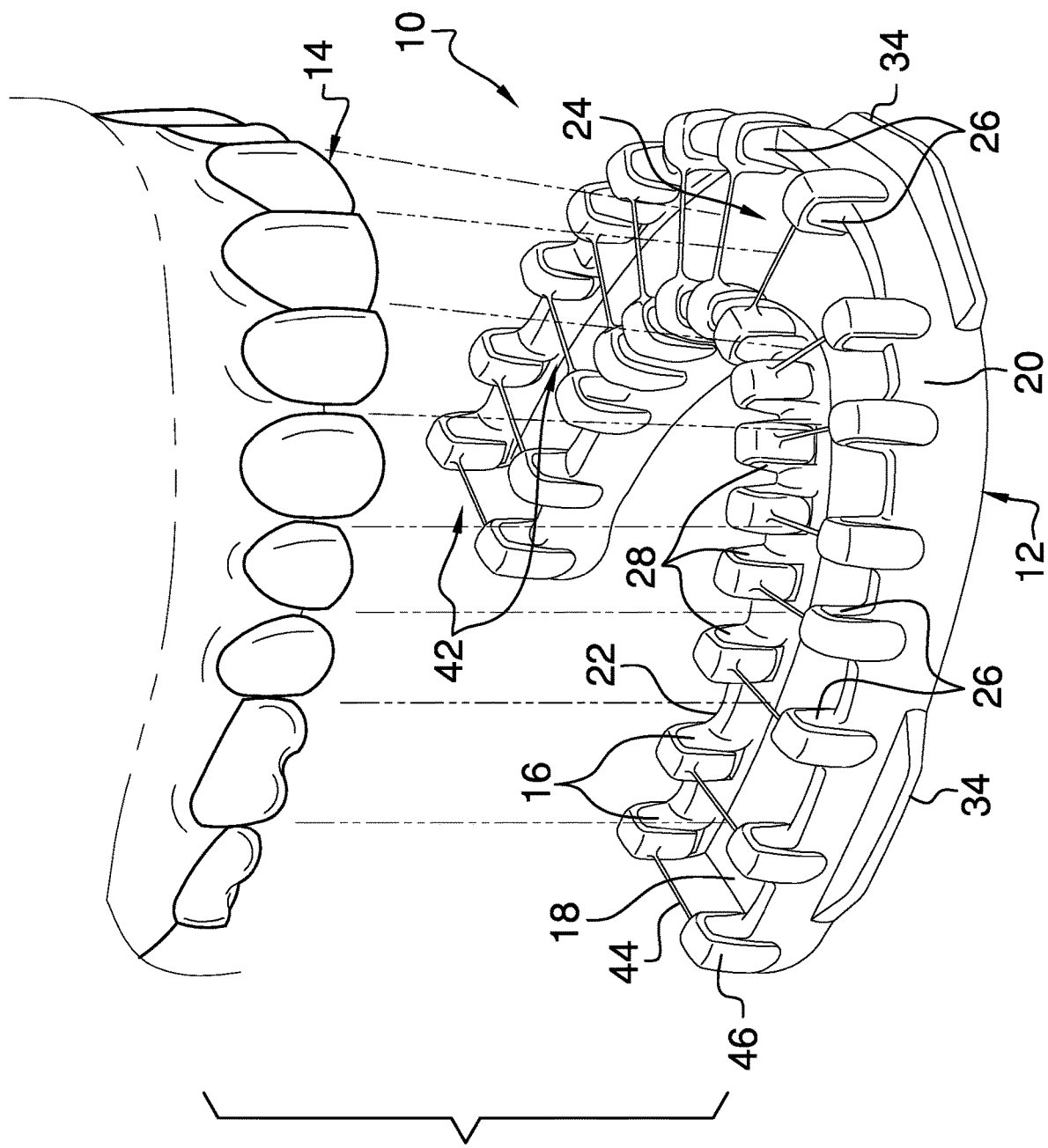
FIG. 1 is a perspective in-use view of a tooth flossing assembly according to an embodiment of the disclosure.
Figure 2:
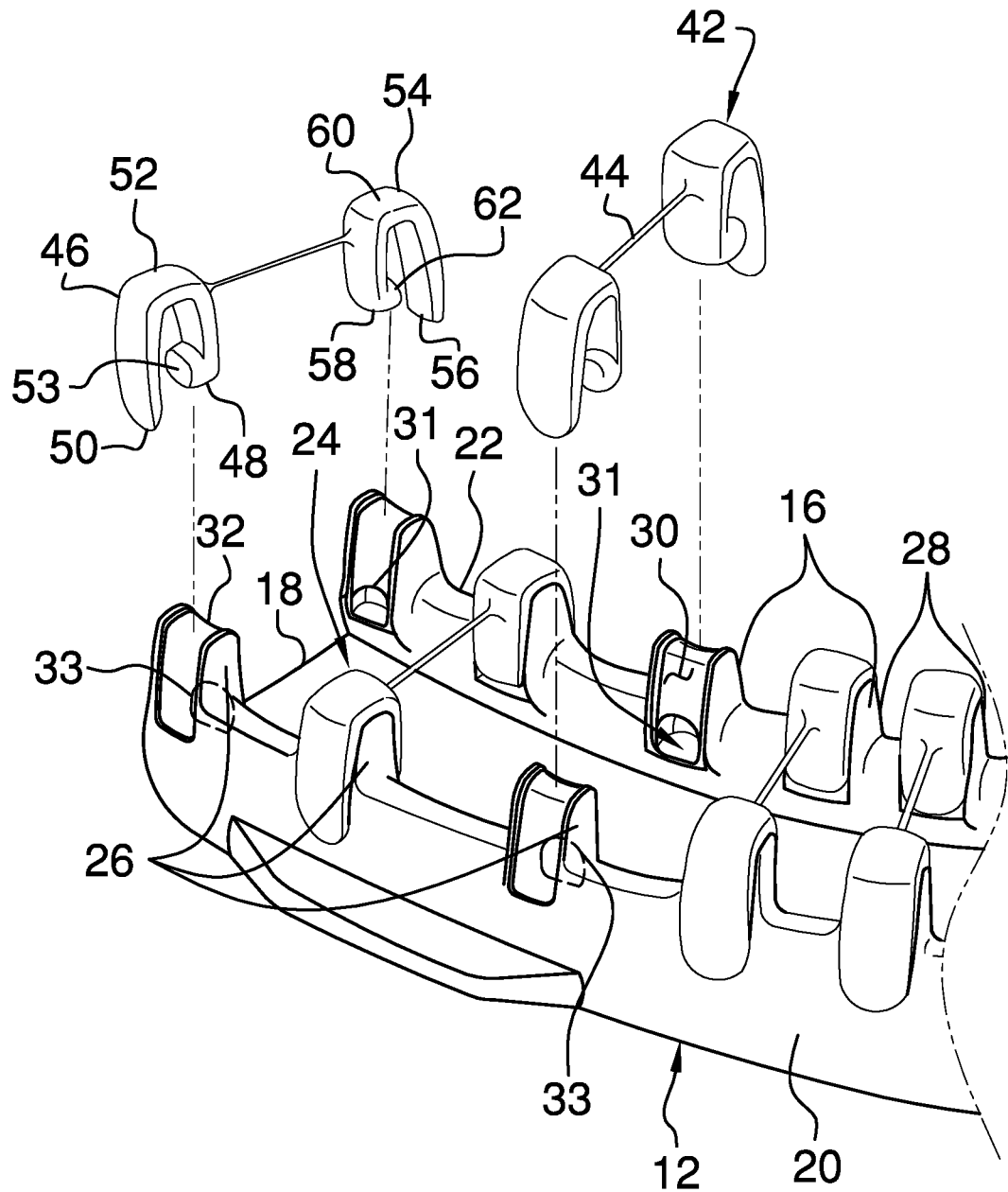
FIG. 2 is an exploded perspective view of an embodiment of the disclosure.
Figure 3:
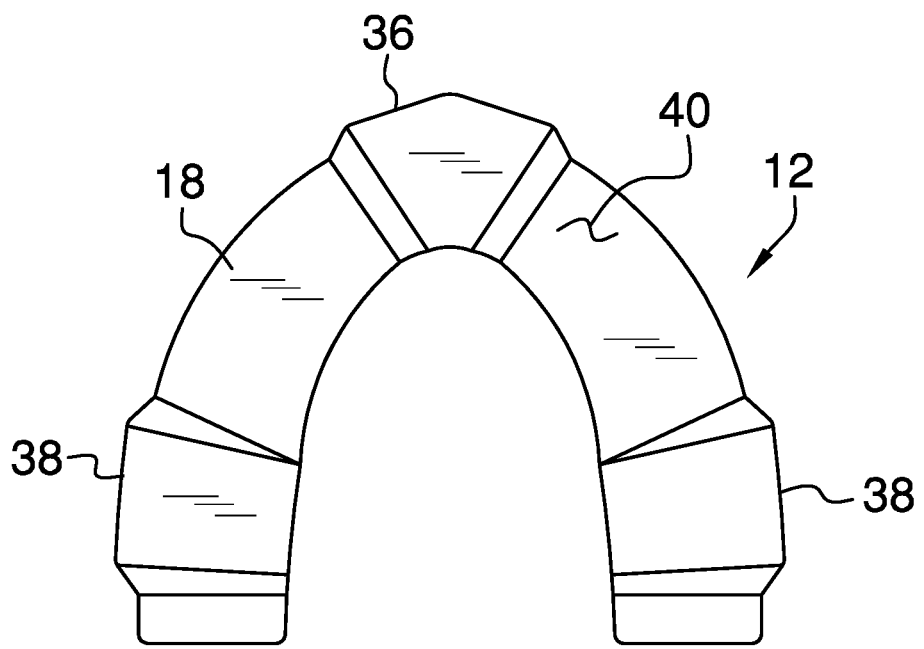
FIG. 3 is a bottom view of an embodiment of the disclosure.
Figure 4:
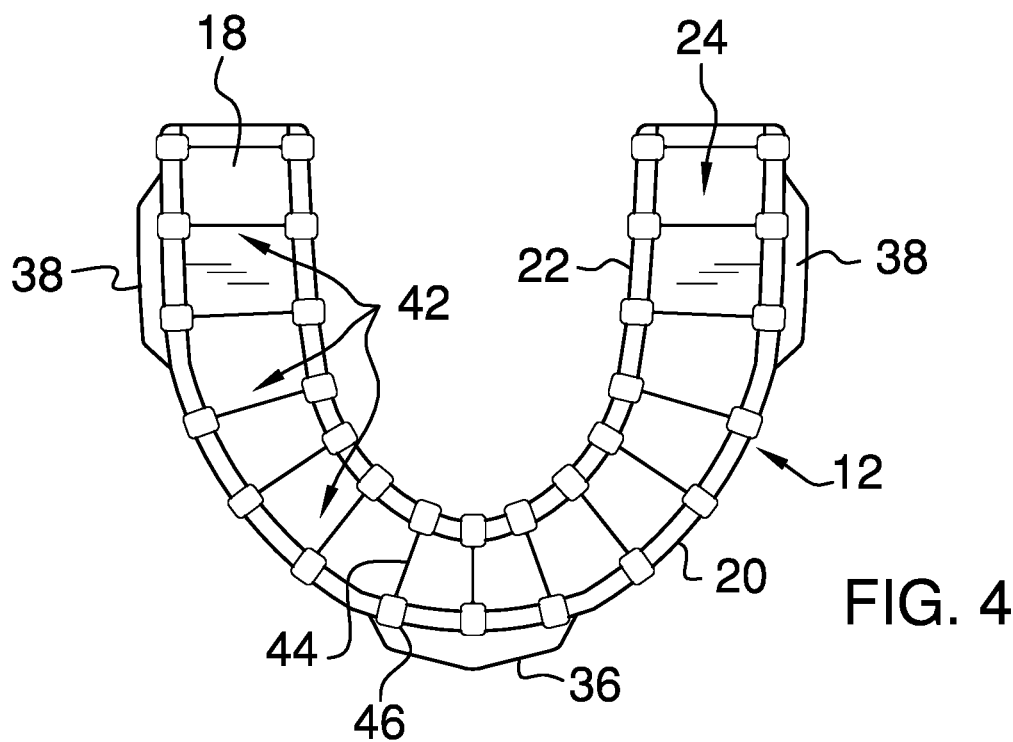
FIG. 4 is a top view of an embodiment of the disclosure.
Figure 5:
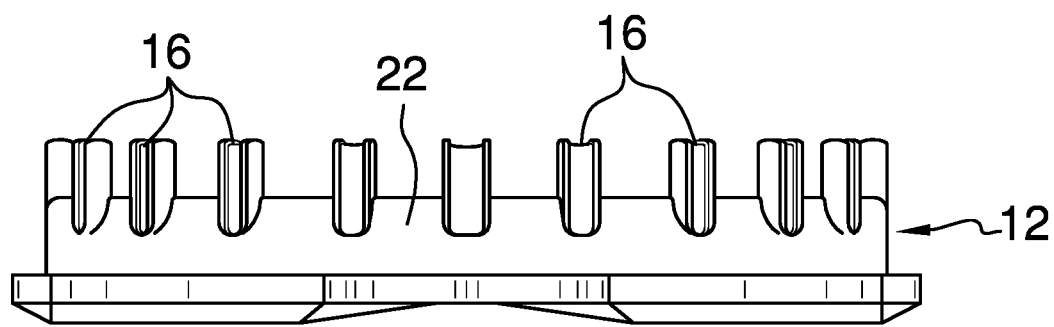
FIG. 5 is a front view of an embodiment of the disclosure.

With reference now to the drawings, and in particular to FIGS. 1 through 5 thereof, a new flossing device embodying the principles and concepts of an embodiment of the disclosure and generally designated by the reference numeral 10 will be described.

As best illustrated in FIGS. 1 through 5, the tooth flossing assembly 10 generally comprises a mouthpiece 12 that is both curved and elongated along a longitudinal axis. In this way the mouthpiece 12 can conform to the curvature of a row of a user's teeth 14. The mouthpiece 12 has a plurality of engagement points 16 positioned thereon. Moreover, the engagement points 16 are spaced apart from each other and are distributed along the mouthpiece 12 at locations corresponding to the locations between each tooth in the row of the user's teeth 14. The mouthpiece 12 may be comprised of a resiliently compressible material, such as silicone or the like, thereby inhibiting the teeth 14 from being damaged by the mouthpiece 12.

The mouthpiece 12 has a lower wall 18, a front wall 20 extending upwardly from the lower wall 18 and a back wall 22 extending upwardly from the lower wall 18. The front wall 20 is spaced from the back wall 22 to define a teeth space 24 between the front 20 and back 22 walls, and each of the front 20 and back 22 walls extends along a full length of the lower wall 18. The plurality of engagement points 16 includes a set of front engagement points 26 and a set of back engagement points 28. Each of the front engagement points 26 extends upwardly from the front wall 20 and each of the back engagement points 28 extends upwardly from the back wall 22.

Each of the back engagement points 28 has a first surface 30 that is directed toward the front wall 20. The first surface 30 of each of the back engagement points 28 has a first well 31 extending inwardly therein. Each of the front engagement points 26 has a first surface 32 that is directed toward the back wall 22. The first surface 32 of each of the front engagement points 26 has a second well 33 extending inwardly therein.

A plurality of grips 34 is each coupled to and extends away from the mouthpiece 12 for gripping the mouthpiece 12. Each of the grips 34 is positioned on the front wall 20 and each of the grips 34 is aligned with an intersection between the front wall 20 and the lower wall 18. The plurality of grips 34 includes a central grip 36 that is centrally positioned between a pair of end grips 38. Additionally, each of the grips 34 may extend along a lower surface 40 of the lower wall 18 of the mouthpiece 12.

A plurality of flossing units 42 is each removably coupled between a respective pair of the engagement points 16. Each of the flossing units 42 including a string 44 that slides between a respective pair of the user's teeth 14 when the user pushes up or bites down on the mouthpiece 12. In this way the plurality of flossing units 42 can simultaneously floss the entire row of teeth 14. Each of the flossing units 42 comprises a first retainer 46 that has a first end 48 and a second end 50. The first retainer 46 has a curved portion 52 such that the first end 48 is spaced from the second end 50 thereby defining a U-shape. Additionally, the first retainer 46 slides downwardly onto a respective one of the front engagement points 26 when the flossing units 42 are removably coupled between the respective pair of engagement points 16. The first retainer 46 has a first prominence 53 thereon, the first prominence 53 is aligned with the first end 48 and the first prominence 53 is directed toward the second end 50. Moreover, the first prominence 53 engages the second well 33 in the first surface 32 of the respective front engagement point 26 to releasably retain the first retainer 46 on the respective front engagement point 26.

Each of the flossing units 42 includes a second retainer 54 that has a primary end 56 and a secondary end 58. The second retainer 54 has a curved portion 60 such that the primary end 56 is spaced from the secondary end 58 thereby defining a U-shape. Additionally, the second retainer 54 slides downwardly onto a respective one of the back engagement points 28 when the flossing units 42 are positioned on the respective pair of engagement points 26. The second retainer 54 has a second prominence 62 thereon, the second prominence 62 is aligned with the secondary end 58 and the second prominence 62 is directed toward the primary end 56. Moreover, the second prominence 62 engages the first well 31 in the first surface 30 of the respective back engagement point 28 to releasably retain the second retainer 54 on the respective back engagement point 28.

The string 44 extends between each of the first 46 and second 54 grips and the string 44 is positioned adjacent to the curved portions 52,60 of each of the first 46 and second 54 grips. Thus, the string 44 is spaced upwardly from the lower wall 18 of the mouthpiece 12 having the string 44 extending laterally across the teeth space 24. The string 44 may comprise dental floss of any conventional design.

In use, the mouthpiece 12, along with all of the engagement points 16 are manufactured to conform to a specific user's teeth 14 using any conventional technological or manufacturing means with respect to the manufacturing of dental forms. Each of the flossing units 42 is attached to the respective pair of engagement points 26 and the mouthpiece 12 is positioned in the user's mouth. Additionally, the mouthpiece 12 is oriented to have the flossing units 42 facing either the top row of the user's teeth 14 or the bottom row of the user's teeth 14. The user pushes up or bites down on the mouthpiece 12 and the string 44 on each of the flossing units 42 passes between the respective pair of teeth 14. In this way either the entire top row or the entire bottom row of the user's teeth 14 is simultaneously flossed. Additionally, the flossing units 42 can be replaced as the string 44 on the flossing units 42 becomes frayed or otherwise unserviceable.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tooth flossing assembly being configured to simultaneously floss an entire row of teeth in a user's mouth, said assembly comprising:

a mouthpiece being curved along a longitudinal axis wherein said mouthpiece is configured to conform to the curvature of a row of a user's teeth, said mouthpiece having a plurality of engagement points being positioned thereon, said engagement points being spaced apart from each other and being distributed along said mouthpiece at locations corresponding to the locations between each tooth in the row of the user's teeth;

a plurality of grips, each of said grips being coupled to and extending away from said mouthpiece for gripping said mouthpiece; and a plurality of flossing units, each of said flossing units being removably coupled between a respective pair of said engagement points, each of said flossing units including a string that slides between a respective pair of the user's teeth when the user pushes up or bites down on said mouthpiece wherein said plurality of flossing units is configured to simultaneously floss the entire row of teeth;

wherein said mouthpiece has a lower wall, a front wall extending upwardly from said lower wall and a back wall extending upwardly from said lower wall, said front wall being spaced from said back wall to define a teeth space between said front and back walls, each of said front and back walls extending along a full length of said lower wall;

wherein said plurality of engagement points includes a set of front engagement points and a set of back engagement points, each of said front engagement points extending upwardly from said front wall, each of said back engagement points extending upwardly from said back wall;

wherein each of said back engagement points has a first surface being directed toward said front wall, said first surface of each of said back engagement points having a first well extending inwardly therein;

wherein each of said front engagement points having a first surface being directed toward said back wall, said first surface of each of said front engagement points having a second well extending inwardly therein;

wherein each of said flossing units comprises a first retainer having a first end and a second end, said first retainer having a curved portion such that said first end is spaced from said second end thereby defining a U-shape, said first retainer sliding downwardly onto a respective one of said front engagement points;

wherein each of said flossing units comprises a second retainer having a primary end and a secondary end, said second retainer having a curved portion such that said primary end is spaced from said secondary end thereby defining a U-shape, said second retainer sliding downwardly onto a respective one of said back engagement points;

wherein each of said first retainers has a first prominence thereon, said first prominence on said being aligned with said first end and being directed toward said second end, said first prominence engaging said first well in said first surface of said respective front engagement point to releasably retain said first retainer on said respective front engagement point; and wherein each of said second retainers has a second prominence thereon, said second prominence on said being aligned with said secondary end and being directed toward said primary end, said second prominence engaging said first well in said first surface of said respective back engagement point to releasably retain said second retainer on said respective back engagement point.

2. The assembly according to claim 1, wherein each of said grips is positioned on said front wall, each of said grips being aligned with an intersection between said front wall and said lower wall, said plurality of grips including a central grip being centrally positioned between a pair of end grips.

3. The assembly according to claim 1, wherein said string extends between each of said first and second retainers, said string being positioned adjacent to said curved portions of each of said first and second retainers such that said string is spaced upwardly from said lower wall of said mouthpiece having said string extending laterally across said teeth space.

4. A tooth flossing assembly being configured to simultaneously floss an entire row of teeth in a user's mouth, said assembly comprising:

a mouthpiece being curved along a longitudinal axis wherein said mouthpiece is configured to conform to the curvature of a row of a user's teeth, said mouthpiece having a plurality of engagement points being positioned thereon, said engagement points being spaced apart from each other and being distributed along said mouthpiece at locations corresponding to the locations between each tooth in the row of the user's teeth, said mouthpiece having a lower wall, a front wall extending upwardly from said lower wall and a back wall extending upwardly from said lower wall, said front wall being spaced from said back wall to define a teeth space between said front and back walls, each of said front and back walls extending along a full length of said lower wall, said plurality of engagement points including a set of front engagement points and a set of back engagement points, each of said front engagement points extending upwardly from said front wall, each of said back engagement points extending upwardly from said back wall, each of said back engagement points having a first surface being directed toward said front wall, said first surface of each of said back engagement points having a first well extending inwardly therein, each of said front engagement points having a first surface being directed toward said back wall, said first surface of each of said front engagement points having a second well extending inwardly therein;

a plurality of grips, each of said grips being coupled to and extending away from said mouthpiece for gripping said mouthpiece, each of said grips being positioned on said front wall, each of said grips being aligned with an intersection between said front wall and said lower wall, said plurality of grips including a central grip being centrally positioned between a pair of end grips; and a plurality of flossing units, each of said flossing units being removably coupled between a respective pair of said engagement points, each of said flossing units including a string that slides between a respective pair of the user's teeth when the user pushes up or bites down on said mouthpiece wherein said plurality of flossing units is configured to simultaneously floss the entire row of teeth, each of said flossing units comprising:

a first retainer having a first end and a second end, said first retainer having a curved portion such that said first end is spaced from said second end thereby defining a U-shape, said first retainer sliding downwardly onto a respective one of said front engagement points, each of said first retainers having a first prominence thereon, said first prominence on said being aligned with said first end and being directed toward said second end, said first prominence engaging said second well in said first surface of said respective front engagement point to releasable retain said first retainer on said respective front engagement point;

a second retainer having a primary end and a secondary end, said second retainer having a curved portion such that said primary end is spaced from said secondary end thereby defining a U-shape, said second retainer sliding downwardly onto a respective one of said back engagement points, said second retainer having a second prominence thereon, said second prominence being aligned with said secondary end and being directed toward said primary end, said second prominence engaging said first well in said first surface of said respective back engagement point to releasably retain said second retainer on said respective back engagement point; and said string extending between each of said first and second retainers, said string being positioned adjacent to said curved portions of each of said first and second retainers such that said string is spaced upwardly from said lower wall of said mouthpiece having said string extending laterally across said teeth space.

* * * * *